Patented Aug. 19, 1930

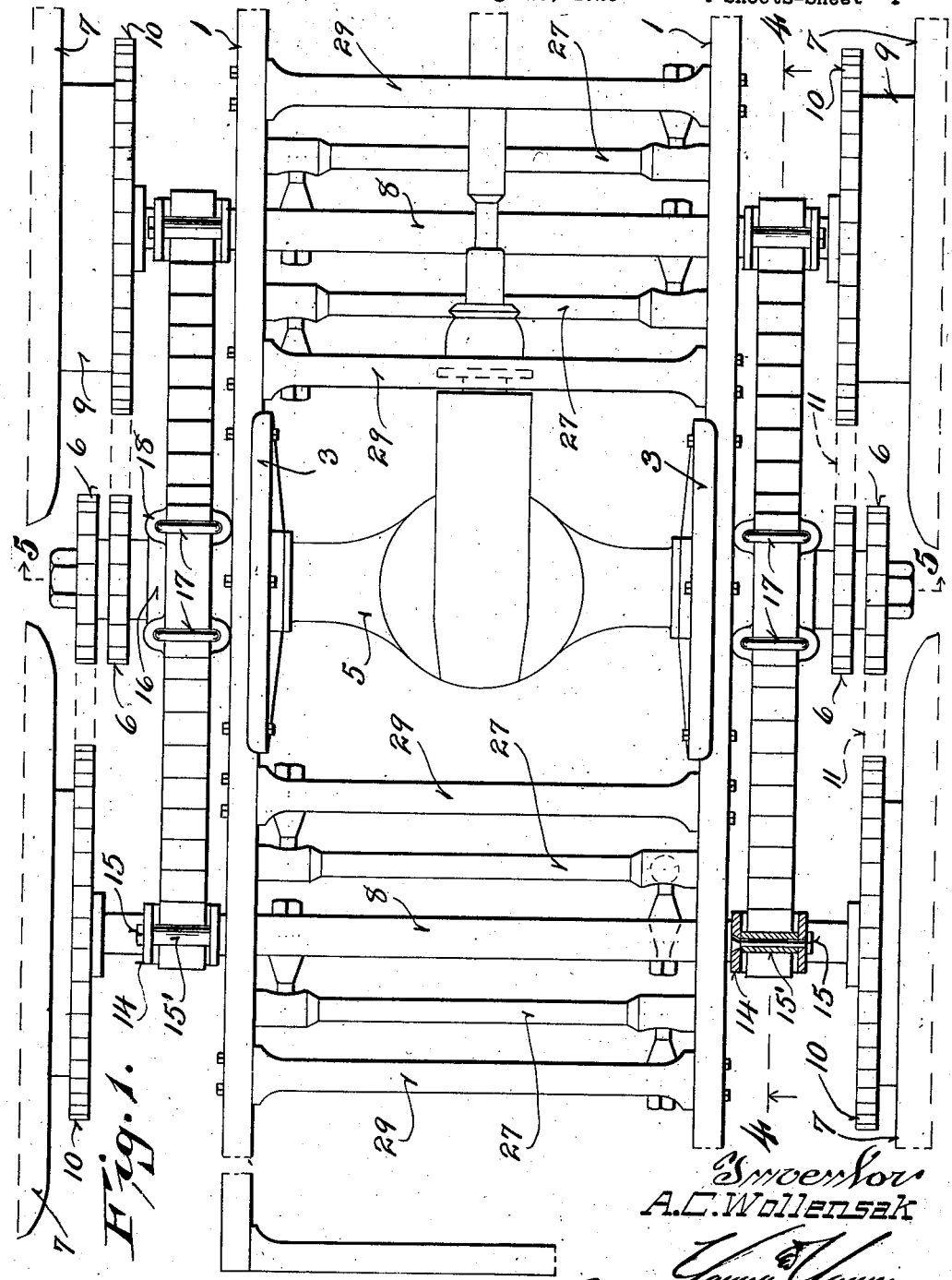

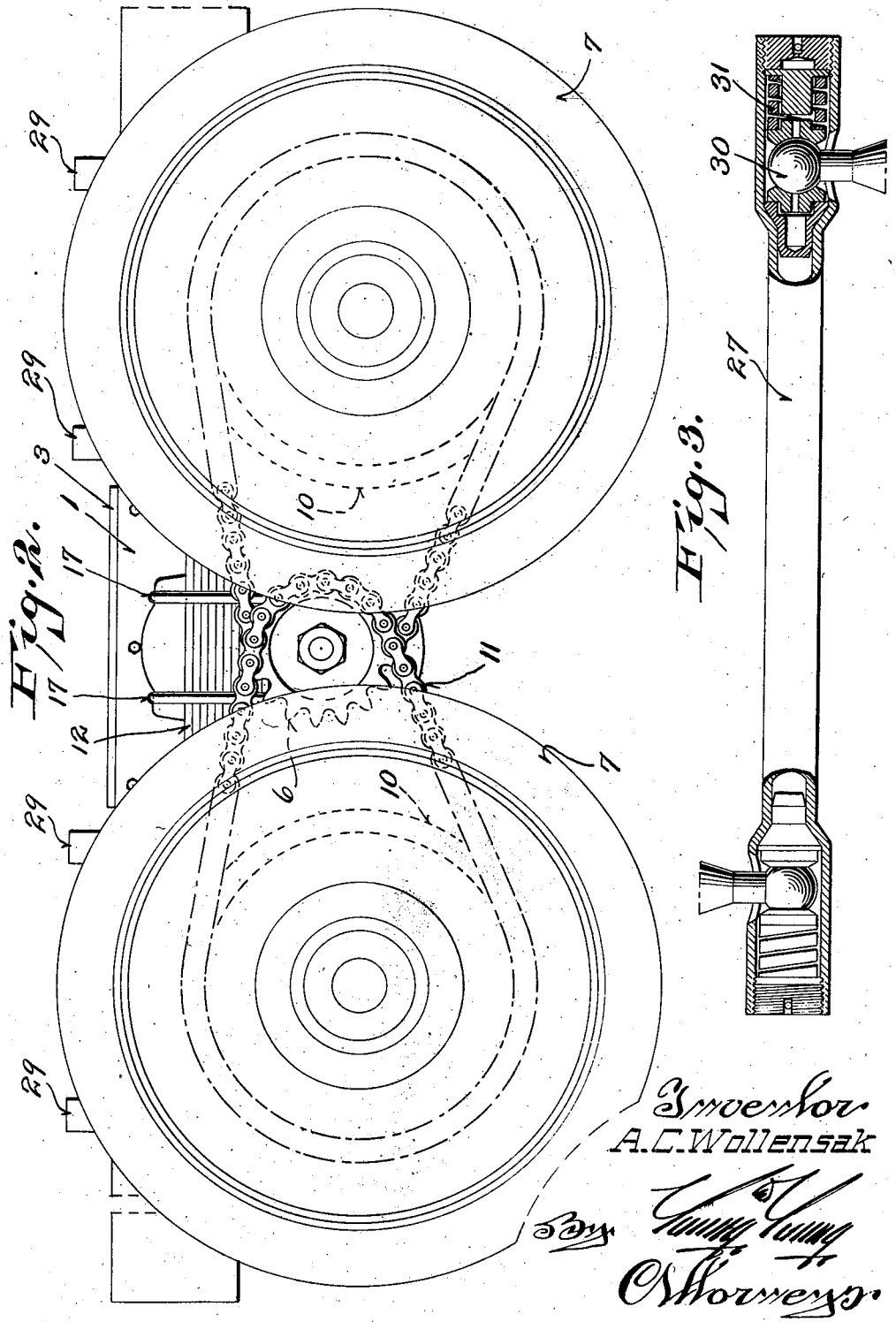

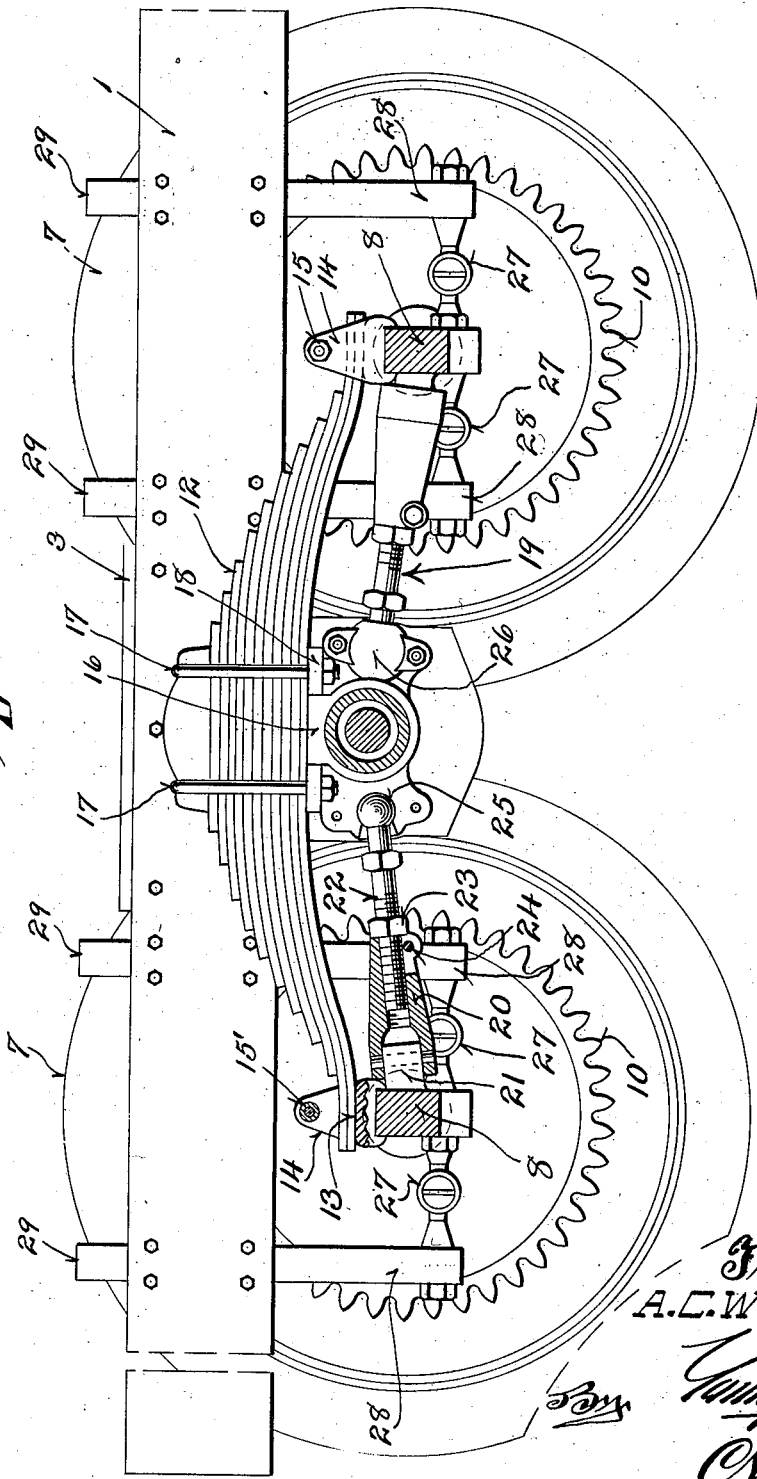

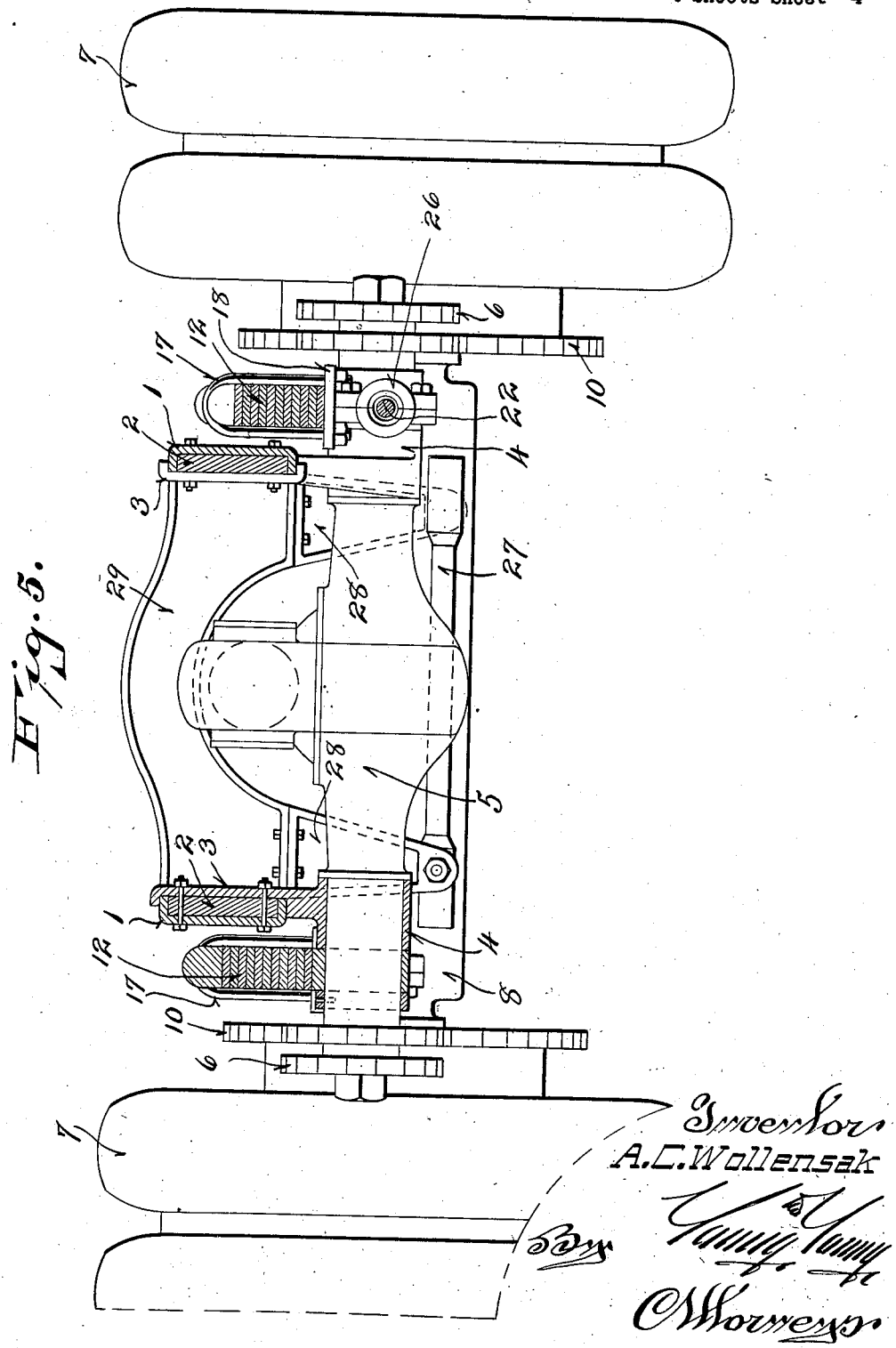

1,773,508

UNITED STATES PATENT OFFICE

ARTHUR C. WOLLENSAK, OF MILWAUKEE, WISCONSIN

SIX-WHEEL MOTOR VEHICLE

Application filed August 25, 1928. Serial No. 302,052.

This invention pertains to six-wheel motor vehicles, and more particularly to improvements in the structure and manner of attaching the driving wheels.

In the present types of six-wheel motor-vehicles it is customary to provide a driving unit of four wheels in conjunction with various conventional types of driving mechanism. In structures of this kind considerable difficulty has been encountered in supporting the traction driving wheels in such manner as to provide free and independent actions of the wheels to compensate for road unevenness, and at the same time maintain proper relation of the wheels to the driving mechanism.

It is the primary object of the present invention to overcome the foregoing difficulties by the provision of novel means for attaching and supporting the axles of the traction wheels.

Incidental to the foregoing a more specific object of the present invention is to provide a pivotally mounted supporting mechanism for the spaced axles of the driving wheels, and means for connecting said axles to the supporting mechanism, whereby free independent action of the wheels is permitted, and proper alignment with each other and the driving mechanism is maintained.

A further object is to provide a floating connection between the axles of the driving wheels and the suspension springs, which permits free action of the axles and avoids twisting or bind upon the springs.

Another object resides in the novel means of connecting the axles to the vehicle frame, to permit free vertical movement, and prevent lateral shifting of the axles.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings Figure 1 is a plan view of a portion of a motor vehicle equipped with the present invention, parts being broken away and in section to more clearly illustrate structural details;

Figure 2 is a side elevation of the same;

Figure 3 is a detail of one of the tie rods with parts broken away and in section;

Figure 4 is a longitudinal section taken on the line 4—4 of the Figure 1;

Figure 5 is a transverse section taken on the line 5—5 of Figure 1.

Referring now more particularly to the accompanying drawings, the numeral 1 designates the conventional side frames of a motor vehicle. Inasmuch as the present invention pertains specifically to the traction unit of the vehicle, only the rear portion of the frame is illustrated.

As shown in Figure 5 the side frames 1 comprise channel irons into which are inserted wood fillers 2 to reinforce the frames and facilitate the attachment of cross members and brackets. While the foregoing structure is desirable it will be understood that the same forms no part of the present invention, as any frame structure may be employed. Secured to the side frames 1 are a pair of brackets 3 provided with depending hub portions 4, which receive the differential housing 5. This may house a drive of any conventional type, such as a double reduction, worm or hypoid gear, in that these types of drive raise the propeller shaft sufficiently above the traction axles to afford proper clearance. Carried upon the differential shafts, at the outer extremities of the housing 5, are the drive sprockets 6, for the purpose of driving the traction wheels as will be hereinafter described.

The traction unit comprises four drive wheels 7 carried upon the axles 8 positioned upon opposite sides of the differential housing 5. The traction wheels are provided with suitable brakes 9, preferably of the hydraulic type, and associated therewith are the driven sprockets 10, connected with the drive sprockets 6, through the chains 11. It is obvious, that by this arrangement the pull upon the drive sprockets 6 and the differential shafts, will be equalized in opposite directions, thus reducing friction and wear to a minimum.

The frame of the vehicle is supported upon the traction axles 8, through two sets of leaf springs 12, the free ends of which engage spring seats 13 carried by the axles and provided with ears 14 adapted to straddle the springs. Bolts 15 passing through the ears 14 carry sleeves 15′ which serve to limit the downward movement of the axles with relation to the springs. The springs 12 are secured upon the spring saddles 16 in the usual manner by U bolts 17, passing over the springs and through the ears 18 carried by the saddle. As best shown in Figures 4 and 5, the saddles 16 are pivotally mounted upon the differential housing 5 whereby the springs are pivoted coaxially with relation to the differential drive shafts.

Connecting the axles 8, to prevent longitudinal shifting are a plurality of radius rods 19, each comprising a socket member 20 pivotally connected to an ear 21 carried by the axle. The socket members 20 adjustably receive the threaded rods 22, which are locked thereto by set nuts 23 and clamping bolts 24 passing through the bifurcated ends of the sockets 20. The opposite ends of the rods 22 are provided with spherical heads 25 received in sockets formed in the spring saddles 16, and clamped therein by caps 26.

From the foregoing explanation taken in connection with the drawings, and particularly Figure 4, it will be seen that the drive wheels are so connected to the vehicle frame as to permit their free independent vertical action, inasmuch as the saddles 16, which carry the suspension springs and the axle radius rods are coaxially and pivotally mounted with relation to the differential driving shafts. Thus as the front and rear sets of driving wheels move vertically in opposite directions to compensate for unevenness in the road, the springs will rock about the axes of the differential shafts and follow the axles, maintaining an equal tension upon each axle, and avoiding any twist or bind upon the leaves. It will also be obvious that longitudinal shifting of the drive wheels with relation to the differential jack shafts is prevented through the radius rod connections between the traction axles 8 and the spring saddles 16.

To prevent lateral shifting of the traction axles 8, each axle is connected at opposite sides to opposed tie rods 27, which in turn are connected to brackets 28 carried by cross members 29, secured to the side frames 1. The connections between the tie rods and the brackets 28 are of the conventional ball and socket type, the sockets being provided in the tie rods, as shown in Figure 3, while the shanks which carry the spherical heads 30 are secured to the axles 8 and the brackets 28. Should one side of one of the axles move up or down through road unevenness, naturally the distance between the ball 30 carried at that side of the axle and the corresponding ball carried by the same tie rod will increase. Therefore, to compensate for this, the sockets in the tie rods are provided with tension springs 31, which permit their outward movement. It will, however, be noted that the sockets are free to move outward only, and therefore bodily lateral shifting of the axle is prevented by the opposed tie rod connecting the opposite end of the axle to the adjacent cross member 29.

From the foregoing it will be seen that a very simple structure has been provided, wherein the cost and weight has been reduced to a minimum. In operation the axles, and consequently the driving wheels are free to move independently to compensate for any condition of road unevenness, while the spring pressure upon the axles is equalized at all times. The tension of one spring is never relieved as in the case of conventional spring mountings, nor can there be any twist or bind exerted upon the springs, as in instances where shackle connections are employed between the springs and axles. The axles are rigidly held against longitudinal shifting through the radius rods connecting the same with the spring saddles and against lateral shifting by the opposed tie rods connected with the vehicle frame.

As has been pointed out, the pull of the driving chains upon the differential jack shafts is equalized in opposite directions, which avoids bending strain on the jack shafts, and reduces wear on the bearings to a minimum. Theoretically the wheel base of the four wheel driving unit is measured between the front and rear wheels, and inasmuch as these are positioned and held equidistant from the differential drive, the differential will at all times function perfectly.

Also, while the invention has been shown and described in connection with four-wheel traction units, it will be understood that the novel manner of connecting an axle to a main frame by means of universal radius rods and universal tie rods, whereby free independent movement of each wheel is obtained without lateral or longitudinal shifting with relation to the main frame, may be utilized to advantage in connection with a two-wheel traction unit.

I claim:

1. A motor vehicle comprising a main frame, differential drive shafts carried by said frame, an auxiliary truck pivotally mounted coaxially with said drive shafts and having a pair of longitudinally spaced axles, a pair of supporting wheels carried by each of said axles, driving connections between said wheels and said differential drive shafts, and means to prevent lateral shifting of said axles with relation to said main frame.

2. A motor vehicle comprising a main frame, differential drive shafts carried by said main frame, springs pivotally mounted coaxially with said drive shafts, a pair of longitudinally spaced axles engaged by said springs, a pair of supporting wheels carried by each of said axles, means for anchoring said axles against longitudinal and lateral shifting with relation to the axis of said drive shafts, and driving connections between said wheels and said differential drive shafts.

3. A motor vehicle comprising a main frame, differential drive shafts carried by said frame, axles positioned upon opposite sides of said differential drive shafts, springs pivotally mounted coaxially with said drive shafts and loosely engaging said axles, wheels carried by said axles, radius rod connections between said axles and said spring mountings to prevent longitudinal shifting of the axles with relation to said drive shafts, tie rods connecting said axles with said main frame to prevent lateral shifting of said axles, and a driving connection between said wheels and said drive shafts.

4. A motor vehicle comprising a main frame, differential drive shafts carried by said frame, spring saddles pivotally mounted coaxially with said drive shafts, leaf springs carried by said spring saddle, axles positioned upon opposite sides of said differential drive shafts and engaged by said springs, wheels carried by said axles, radius rods connecting said axles with said spring saddles, tie rods connecting said axles to said main frame to prevent lateral shifting of said axles with relation to said main frame, and a driving connection between said wheels and said drive shafts.

5. A motor vehicle comprising a main frame, brackets secured to the main frame, a differential housing mounted in said brackets, spring saddles pivotally mounted coaxially with said differential housing, leaf springs carried by said saddles, axles positioned upon opposite sides of said differential housing and loosely engaged by said springs, wheels carried by said axles, radius rods connecting said axles with said spring saddles, tie rods connecting said axles to said main frames to prevent lateral shifting of said axles with relation to said main frame, and a driving connection between said wheels and said drive shafts.

6. A motor vehicle comprising a main frame, a differential housing carried by said main frame, spring saddles pivotally mounted coaxially with said differential housing, leaf springs carried by said spring saddles, axles positioned upon opposite sides of said differential housing and loosely engaged by said springs, wheels carried by said axles, radius rods connecting said axles with said spring saddles, tie rods universally connected with said axles to said main frame to prevent lateral shifting of said axles with relation to said main frame, and a driving connection between said wheels and said drive shafts.

7. A motor vehicle comprising a main frame, differential drive shafts carried by said frame, an auxiliary truck pivotally mounted coaxially with said drive shafts, longitudinally spaced axles resiliently carried by said auxiliary truck to permit free, independent, vertical movement of said axles, means to prevent longitudinal shifting of said axles with relation to said main frame, a tie rod pivotally connected to each side of said axles and to the opposite side of said main frame to prevent lateral shifting of said axles with relation to said main frame, and a driving connection between said wheels and said drive shafts.

8. A motor vehicle comprising a main frame, differential drive shafts carried by said main frame, spring saddles pivotally mounted coaxially with said drive shafts, leaf springs carried by said spring saddles, axles positioned upon opposite sides of said differential drive shafts and loosely engaged by said springs, wheels carried by said axles, radius rods connecting said axles to said spring saddles, and a tie rod pivotally connected to each side of said axles and to the opposite side of said main frame to prevent lateral shifting of said axles, and a driving connection between said wheels and said drive shafts.

9. A motor vehicle comprising a main frame, differential drive shafts carried by said frame, an auxiliary truck pivotally mounted coaxially with said drive shafts and having a pair of longitudinally spaced axles, a pair of supporting wheels carried by each of said axles, driving connections between said wheels and said differential drive shafts, and connections between said axles and said main frame to allow vertical oscillatory movement of said axles and prevent lateral movement of said axles with relation to said main frame.

10. A motor vehicle comprising a main frame, differential drive shafts carried by said main frame, springs pivotally mounted coaxially with said drive shafts, a pair of longitudinally spaced axles supporting said springs, a pair of wheels carried by each of said axles, universal connections for anchoring said axles against longitudinal and lateral shifting with relation to the axes of said drive shafts, and driving connections between said wheels and said differential drive shafts.

11. A traction unit for motor vehicles comprising an axle, springs carried by the frame of said vehicle and supported upon said axle, radius rods universally connected to opposite sides of said axle and to the vehicle frame to prevent longitudinal shifting of said axle with relation to said frame, and laterally extending tie rods universally connected to opposite sides of said axle and to said frame to prevent lateral shifting of said axle with relation to the vehicle.

In testimony that I claim the foregoing I have hereunto set my hand at Milwaukee, in the county of Milwaukee and State of Wisconsin.

ARTHUR C. WOLLENSAK.